United States Patent [19]

Becker et al.

[11] Patent Number: 5,684,444

[45] Date of Patent: Nov. 4, 1997

[54] CODING HEAD FOR THE MAGNETIZATION OF LAYERS

[75] Inventors: Helmut Becker; Jan-Thomas Rebsch, both of Berlin, Germany

[73] Assignee: Bogen Electronic GmbH, Germany

[21] Appl. No.: 564,806

[22] Filed: Nov. 29, 1995

[30] Foreign Application Priority Data

Nov. 30, 1994 [DE] Germany ............ 44 42 682.8

[51] Int. Cl.⁶ ...................... H01F 7/20; H01F 13/00
[52] U.S. Cl. ........................................... 335/284
[58] Field of Search ........................ 360/110–127; 335/284

[56] References Cited

U.S. PATENT DOCUMENTS

| | | | |
|---|---|---|---|
| 4,210,946 | 7/1980 | Iwasaki et al. | 360/131 |
| 4,251,842 | 2/1981 | Iwasaki et al. | 360/134 |
| 5,031,064 | 7/1991 | Ashikawa et al. | 360/122 |
| 5,085,935 | 2/1992 | Mallary | 428/336 |

FOREIGN PATENT DOCUMENTS

| | | |
|---|---|---|
| 0 128 625 | 12/1984 | European Pat. Off. . |
| 1 549 085 | 2/1971 | Germany . |
| 92 03 727.5 | 5/1993 | Germany . |
| 2 006 509 | 5/1979 | United Kingdom . |

OTHER PUBLICATIONS

Annals of Physics (Annalen der Physik), V. Poulsen, Nov. 1900, vol. 3, pp. 754–760.

An Analysis for the Magnetization Mode for High Density Magnetic Recording, Iwasaki et al, IEEE Trans. on Magn., vol. MAG–13, No. 5, pp. 1272–1275, 1977.

Primary Examiner—Michael L. Gellner
Assistant Examiner—Raymond Barrera
Attorney, Agent, or Firm—Finnegan, Henderson, Farabow, Garrett & Dunner, L.L.P.

[57] ABSTRACT

A coding head for applying magnetic codes onto magnetizable layers of scales, graduations, angle encoders, transport belts and the like has a magnetic pole (10) about which a coil (12) is wound, the saturation induction of the magnetic pole being selected in dependence upon the coercive field strength of the magnetizable layer (18). In this case, the saturation induction (in Tesla) has a specified relationship to the coercive field strength (in kOe).

8 Claims, 1 Drawing Sheet

CODING HEAD FOR THE MAGNETIZATION OF LAYERS

The present invention relates to a coding head for applying magnetic codes onto magnetizable layers of scales, graduations, angle encoders, transport belts and the like.

Scales with a magnetically produced graduation are known and have proved to be advantageous in comparison to optical graduations particularly in the case of unfavorable surrounding conditions. Such magnetized codes allow fine graduations. In this case, additional interpolations of very high accuracies can be achieved for positioning or measurement. In uses in which such high requirements are not placed on the resolution of the position or the angle, magnetic graduations also offer themselves in comparison to optical graduations, especially if a mechanic robustness and insensitivity with respect to dirt and wear are to the fore. In so far as the magnetically produced parts are to be insensitive with respect to magnetic disturbing fields, magnetizable layers with higher coercive field strengths are required.

Additionally, it is advantageous in the case of high mechanical loads to use materials with a layer thickness of up to 1 mm. However, such large layer thicknesses place additional unusual requirements on the magnetizing apparatus.

Transport belts and toothed belts including an integrated magnetic track that can be magnetically coded are already known in the field of conveyance technology. However, in order to code these magnetic tracks, magnetizing apparatus are necessary by means of which a current of the magnitude of up to 30 kA flows in the magnetizing process. However, such a high current strength is uneconomical for a continuous operation and for the production of larger numbers or lengths.

The present invention is therefore based on the problem (object) of providing a coding head for applying a magnetic code by means of which, at low current strength, materials with a layer thickness of up to 1 mm can be durably magnetized.

This object is solved by the features of claim 1.

In accordance with the invention, a coding head is provided, the magnetic pole of which is wound with at least one coil, the magnetic pole having a saturation induction $B_s$ which is selected in dependence upon the coercive field strength $H_c$ of the magnetizable layer. In this case, the following relationships apply: in dependence upon the coercive field strength $H_c$ of the magnetizable layer (18) taking the following relationships into account, there is selected: $B_s$ (Tesla) $\cong 0.4 \times H_c$ (kOe) for layer thicknesses of essentially 0.01 to 0.09 mm; or $B_s$ (Tesla) $\cong 0.2 \times H_c$ (kOe) for layer thicknesses of essentially 0.4 to 1.0 mm.

On account of the increasing demands for lasting quality of the applied magnetization, coercive field strengths to the magnitude of 1000 to 5000 Oe are desirable, even materials with up to 10,000 Oe being possible. In this case, the corresponding number of windings of the coils of the magnetic pole amount to 10 to 2000.

When materials with a low $H_c$ are coded, protective measures to safeguard from external influences are possibly necessary. On account of the inventive magnetization apparatus, such materials can also be durably coded even in the case of large layer thicknesses, a current of only approximately 1 Ampere being necessary, for example, in the case of a coercive field strength of 1000 Oe and certain layer thicknesses.

Advantageous embodiments of the invention are characterized by the dependent claims.

Thus, in accordance with claim 2, the magnetic pole has a surface from which the magnetic lines of flux emerge, this surface being capable of being orientated substantially parallel to the magnetizable layer. As a result of a magnetic pole designed in such a manner, the magnetizable layer can be magnetized perpendicular to its extension, which can be particularly advantageous with a high coercive field strength especially in the case of relatively large layer thicknesses. Simultaneously, codes of a relatively large surface area can be applied with the coding head of this embodiment taking the above relationships into account, this having been held up to now in the technical field as not being capable of realization.

According to a further embodiment of the invention, the magnetic pole can form an open magnetic circuit. As a result of such a design of the inventive apparatus, a very simple structure in mechanical terms is provided. The magnetizing apparatus can be easily guided over the magnetizable layers or, in the alternative, the layers to be magnetized can be guided over the apparatus. In this case, the relative movement between the magnetizing apparatus and the layers to be magnetized can be linear or rotational. Although, in accordance with previous considerations, the magnetic circuit of a magnetizing apparatus should always be closed apart from a narrow gap, it has turned out that the design with an open magnetic circuit offers great advantages for the specific use of magnetization of scales, graduations, angle encoders, transport belts and the like.

According to a further embodiment of the invention, the saturation induction $B_s$ of the magnetic pole can amount to between 0.5 and 3 Tesla. On account of this, materials with a coercive field strength in the range of 1.25 to 15 kOe can be magnetized. With an increasing coercive field strength, a durable coding is provided which is also not influenced by disturbing fields.

According to a further embodiment of the invention, the surface designed in accordance with claim 2 can be rectangular and one edge of the surface can be between 0.1 and 4 mm and the other edge between 1 mm and 50 mm long. As a result of a magnetic pole designed in such a manner, fine graduations can be produced, the size of the surface simultaneously corresponding to the size of the applied coding. Therefore, according to requirements, the size of the produced coding can be adjusted by variation of the size of the surface.

According to a further design of the embodiment of claim 2, the medium to be magnetized can be located between the surface and a low-retentivity opposing body. By means of such an opposing body, the lines of flux emerging from the magnetic pole which have penetrated through the layer to be magnetized can subsequently be collected. In this manner, codes with very narrow spatial boundaries can be applied. The opposing body can in this case be a plate or a roll and it is also possible that it is shaped in such a manner that the material to be magnetized is pressed against the magnetic pole.

According to a further embodiment of the invention according to claim 2, wear reducing skids, in particular of ceramics, can be provided in the region of the surface. Such skids significantly reduce the wear of the magnetic poles when the magnetization process ensues in contact with the medium to be magnetized. The skids can also be produced from sapphire or the like. Additionally, wear protection by means of a coating is conceivable, for example by producing a protective layer in a plasma jet.

A further inventive concept is the special use of a coding head with a magnetic pole having at least one coil wound around it and having a surface from which the magnetic lines of flux emerge, this surface being capable of being orientated substantially parallel to the magnetizable layer. Such a magnetic head was already suggested at the beginning of the century by V. Poulsen (Annals of Physics (Annalen der Physik), November 1900, vol. 3, p. 754–760)). In more recent times, this idea was taken up again by Iwasaki (IEEE Trans. on Magn. vol. MAG—13 No. 5, p. 1272–1275, 1977) for the technical field of data processing technology in order to magnetize magnetic fixed disks parallel to the disk axis. However, the use of such a magnetic head known in principle from data processing technology to apply magnetic codes onto magnetizable layers of scales, graduations, angle encoders, transport belts, magnetic cards and the like was not suggested up to now in the state of the art. It has in fact turned out that the transfer of this principle known from the technical field of data processing technology onto the magnetization of scales and the like provides advantages because very durable and, in particular, also large-surfaced magnetic codes can be applied in a short time.

The present invention is described in the following purely by way of example with respect to advantageous embodiments, in which.

Figure 1:
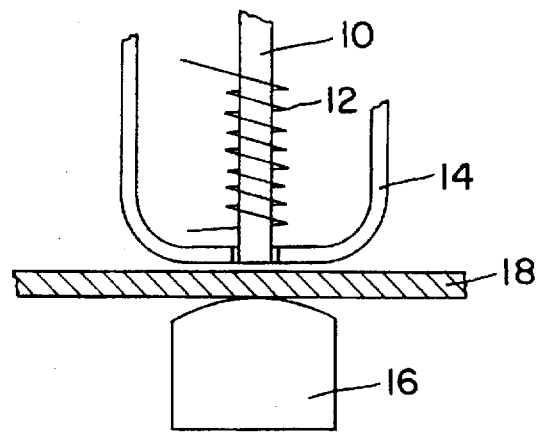
FIG. 1 is a side view of an inventive coding head.

FIG. 1 shows an embodiment of a coding head according to the invention with a magnetic pole 10 about which a coil winding 12 is wound. The magnetic pole 10 about which the coil 12 is wound is arranged in a non-magnetic housing 14 that is provided with an appropriate opening into which the magnetic pole 10 is inserted in a flush manner. Reference sign 16 designates a counter-pole plate of a low-retentivity material which focuses the magnetic lines of flux that have penetrated through the medium 18 to be magnetized.

As FIG. 1 shows, the magnetic lines of flux emerge from a surface of the magnetic pole which is orientated parallel to the magnetizable material 18. In this manner, an open magnetic circuit is formed in the exemplary embodiment illustrated in FIG. 1. The surface of the magnetic pole through which the lines of magnetic flux enter into the magnetizing layer 18 is rectangular. In this case, the shape and size of the surface is adapted to the respective use. Side dimensions of the surface of between 0.1 and 50 mm are possible.

The saturation induction $B_s$ of the magnetic pole 10 is selected in dependence upon the coercive field strength $H_c$ of the magnetizable layer 18, the following relationship existing between the coercive field strength $H_c$ and the saturation induction $B_s$: $B_s$ (Tesla)≅0.4×$H_c$ (kOe) for layer thicknesses of substantially 0.01 to 0.09 mm and $B_s$ (Tesla) ≅0.2×$H_c$ (kOe) for layer thicknesses of substantially 0.4 to 1.0 mm.

The pole material of the magnetic pole 10 consists of a cobalt-iron-alloy with a saturation induction of a magnitude of two Tesla. Further materials are low-retentitivy metals with a saturation induction adapted to the coercive field strength of the layer to be magnetized. For the magnetizable layers, all magnetizable media are conceivable which have a coercive field strength with a magnitude of approximately >200 Oe.

The current flowing during the magnetization process through the coil 12 has a magnitude of approximately 1 Ampere, and in the case of a continuous operation in which the medium 18 to be magnetized and the coding head are moved linearly or rotationally relative to one another, the duration of switch-on of the magnetization current is only a fraction of that which the time period needs to be resulting from the speed. This considerably reduces the heat load on the coding head. On account of the open magnetic circuit which is illustrated in FIG. 1, sufficiently short building-up times for the magnetization current are realizable if sufficiently small inductivities are selected. The appropriate parameters such as pole thickness, number of windings, current strength and core material must in this case be adapted to the respective requirements.

In the embodiment illustrated in FIG. 1, the magnetization of the medium 18 can also ensue contactlessly. On account of this, a wear of the coding head is entirely eliminated. If a magnetization in contact takes place, the life time can be increased and the wear reduced by means of wear-resistant slide skids of ceramics, sapphire or the like or by appropriate coating of the coding head.

A continuous operation with a speed of between 0.5 cm per second and 3 m per second is possible with the coding head according to the invention. In this case, the thickness of the magnetic graduation is especially important.

Figure 2:
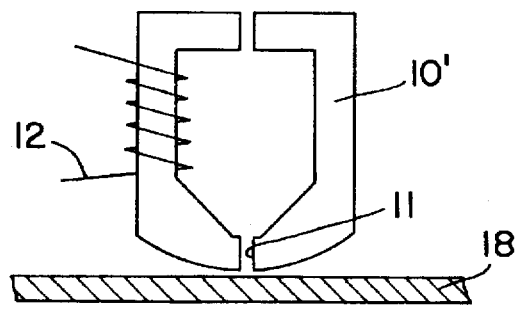
FIG. 2 is a side view of a further embodiment of the inventive coding head, the structural design of which is similar to a magnetic head known from magnetic recording technology.

FIG. 2 shows a further embodiment of the invention which is similar in structural terms to a commonly known magnetic head in magnetic recording technology. In this embodiment, a magnetic core 10' about which a coil 12 is wound forms a closed magnetic circuit, the lines of flux emerging from a gap 11.

Figure 3:
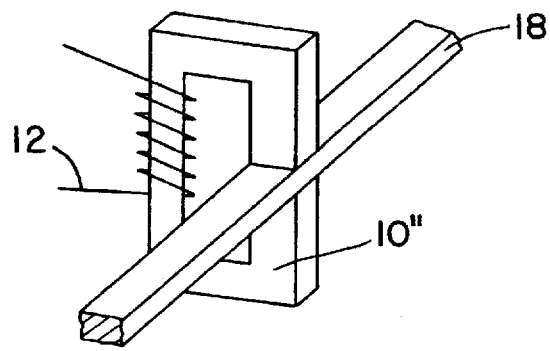
FIG. 3 is an even further embodiment of a coding head according to the invention.

In the embodiment illustrated in FIG. 3, the medium 18 is guided through the gap of an annular core 10" about which a coil winding 12 is wound. The medium 18 is also completely magnetized through in this case and the surface of the annular core from which the lines of flux emerge corresponds to the surface of the magnetic code.

We claim:

1. A coding head for applying magnetic codes onto a magnetizable layer having varying thickness and a coercive field strength $H_c$, comprising:

a magnetic pole;

at least one coil wound about the magnetic pole;

the magnetic pole having a saturation induction $B_s$ and a surface from which magnetic lines of flux emerge, the surface being capable of orientation substantially parallel to the magnetizable layer;

the saturation induction $B_s$ of the magnetic pole being selected in dependence upon the coercive field strength $H_c$ of the magnetizable layer wherein:

$B_s$ (Tesla)≅0.4×$H_c$ (kOe) for layer thicknesses of essentially 0.01 to 0.09 mm; or $B_s$ (Tesla)≅0.2×$H_c$ (kOe) for layer thicknesses of essentially 0.4 to 1.0 mm.

2. The coding head according to claim 1, wherein the surface is rectangular and having a width of between 0.1 and 4 mm and a length of between 1 and 50 mm.

3. The coding head according to claim 1, including a low-retentivity opposing body on a side of the medium to be magnetized opposite from the surface.

4. The coding head according to claim 3, wherein the opposing body is a plate or a roll.

5. The coding head according to claim 1, wherein the magnetic pole forms an open magnetic circuit.

6. The coding head according to claim 1, wherein the saturation induction $B_s$ of the magnetic pole is between 0.4 and 3 Tesla.

7. The coding head according to claim 1, wherein the pole material consists of a cobalt-iron-alloy.

8. The coding head according to claim 1, wherein the coil current amounts to at least 0.4 A.

* * * * *